(12) United States Patent
Ge

(10) Patent No.: US 8,793,484 B2
(45) Date of Patent: Jul. 29, 2014

(54) ELECTRONIC DEVICE WITH MESSAGE ENCRYPTION FUNCTION AND MESSAGE ENCRYPTION METHOD

(75) Inventor: Ping Ge, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/246,876

(22) Filed: Sep. 28, 2011

(65) Prior Publication Data

US 2013/0013913 A1 Jan. 10, 2013

(30) Foreign Application Priority Data

Jul. 8, 2011 (CN) .......................... 2011 1 0190794

(51) Int. Cl.
*H04L 9/28* (2006.01)
*G06F 21/62* (2013.01)

(52) U.S. Cl.
CPC ...................................... *G06F 21/62* (2013.01)
USPC .......................................................... 713/153

(58) Field of Classification Search
USPC .................................. 713/150, 153; 380/255
See application file for complete search history.

(56) References Cited

U.S. PATENT DOCUMENTS

| 6,986,050 | B2 * | 1/2006 | Hypponen | 713/183 |
| 2007/0260876 | A1 * | 11/2007 | Brown et al. | 713/156 |
| 2011/0302408 | A1 * | 12/2011 | McDermott et al. | 713/153 |

FOREIGN PATENT DOCUMENTS

| TW | 200731751 A | 8/2007 |
| TW | 201029435 A1 | 8/2010 |

OTHER PUBLICATIONS

Office action mailed on Apr. 14, 2014 for the Taiwan application No. 100124675, filing date: Jul. 12, 2011, p. 1 line 13~14, p. 2 and p. 3 line 1~13.

* cited by examiner

*Primary Examiner* — Ellen Tran
(74) *Attorney, Agent, or Firm* — Winston Hsu; Scott Margo

(57) ABSTRACT

An electronic device with a message encryption function that includes a message processing module for receiving or sending or reading encrypted messages. The message processing module is electrically connected to a configure interface module, a storage module and an encryption module. The message processing module checks whether an encryption code exists. Then the message processing module checks whether the message processing event is "reading a message". If the processing module determines the processing event is "reading a message" the processing module determines whether the encrypted message has been read or not. If the encrypted message has been read the processing module directly transmits the encrypted message back and then displays the encrypted message. If the encrypted message has not been read the processing module decrypts the encrypted message to generate a decrypted message and transmits the decrypted message back and then displays the decrypted message in a clear-text manner.

7 Claims, 3 Drawing Sheets

ELECTRONIC DEVICE WITH MESSAGE ENCRYPTION FUNCTION AND MESSAGE ENCRYPTION METHOD

BACKGROUND OF THE INVENTION

1. Field of the Invention

The present invention relates to an electronic device with an encryption function and a message encryption method, and more specifically, to an electronic device capable of encrypting and then storing a received or sent message and a message encryption method.

2. Description of the Prior Art

With development of technology, electronic devices are widely used in daily life, such as a mobile phone, a PDA (Personal Digital Assistant), or a tablet computer. In general, most electronic devices allow different users to send messages to each other via SMS (Short Message Service), MMS (Multimedia Message Service), an e-mail service, or other message service.

Inevitably, an electronic device owned by a user may be lent to another person. When the electronic device is lent to another person, this person may possibly view private messages stored in the electronic device. Furthermore, if a message or an e-mail is sent to the electronic device suddenly during this person utilizes the electronic device, this person may also view the message or the e-mail by accident. In other words, when the electronic device is lent to another person, the owner of the electronic device can not prevent received or stored messages in the electronic device from being viewed by this person. This problem may cause the owner of the electronic device much trouble.

SUMMARY OF THE INVENTION

The present invention provides an electronic device with a message encryption function. The electronic device includes a configure interface module, a storage module, an encryption module, and a message processing module. The configure interface module is used for setting an encryption code. The message processing module is electrically connected to the configure interface module, the storage module and the encryption module for receiving or sending a message, accessing the encryption code from the configure interface module, and transmitting the message and the encryption code to the encryption module. The encryption module encrypts the message with the encryption code so as to generate an encrypted message and then transmits the encrypted message to the message processing module. The message processing module stores the encrypted message in the storage module.

According to the claimed invention, the message processing module checks whether the encryption code exists when the message processing module receives or sends the message, and the message processing module triggers the configure interface module to set the encryption code if the encryption does not exist.

According to the claimed invention, the message processing module accesses the encryption code from the configure interface module and transmits the encrypted message, a message type, and the encryption code to the encryption module when the message processing module reads the encrypted message from the storage module, the encryption module determines whether the encrypted message has been read or not, the encryption module decrypts the encrypted message with the encryption code to generate a decrypted message and then transmits the decrypted message to the message processing module if the encrypted message has been not read yet, and the encryption module directly transmits the encrypted message to the message processing module if the encrypted message has been read.

According to the claimed invention, the electronic device further includes a display module electrically connected to the message processing module for displaying the encrypted message or the decrypted message.

According to the claimed invention, the message processing module checks whether the encryption code has been set over a timeout time when the message processing module reads the encrypted message from the storage module, and the message processing module triggers the configure interface module to reset another encryption code if the encryption code has been set over the timeout time.

According to the claimed invention, the message processing module checks whether the encrypted code exists if the encrypted code has been not set over the timeout time yet, and the message processing module triggers the configure module to set the encryption code if the encryption code does not exist.

According to the claimed invention, the configure interface module includes a memory unit for storing the encryption code.

The present invention further provides a message encryption method including setting an encryption code, receiving or sending a message, encrypting the message with the encryption code to generate an encrypted message, and storing the encrypted message.

According to the claimed invention, the message encryption method further includes checking whether the encryption code exists when sending or receiving the message and setting the encryption code if the encryption code does not exist.

According to the claimed invention, the message encryption method further includes reading the encrypted message, determining whether the encrypted message has been read or not according to a message type, decrypting the encrypted message with the encryption code to generate a decrypted message if the encrypted message has been not read yet, and not decrypting the encrypted message if the encrypted message has been read.

According to the claimed invention, the message encryption method further includes checking whether the encryption code has been set over a timeout time when reading the encrypted message and resetting another encryption code if the encryption code has been set over the timeout time.

According to the claimed invention, the message encryption method further includes checking whether the encryption code exists if the encryption code has been not set over the timeout time and setting the encryption code if the encryption code does not exist.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
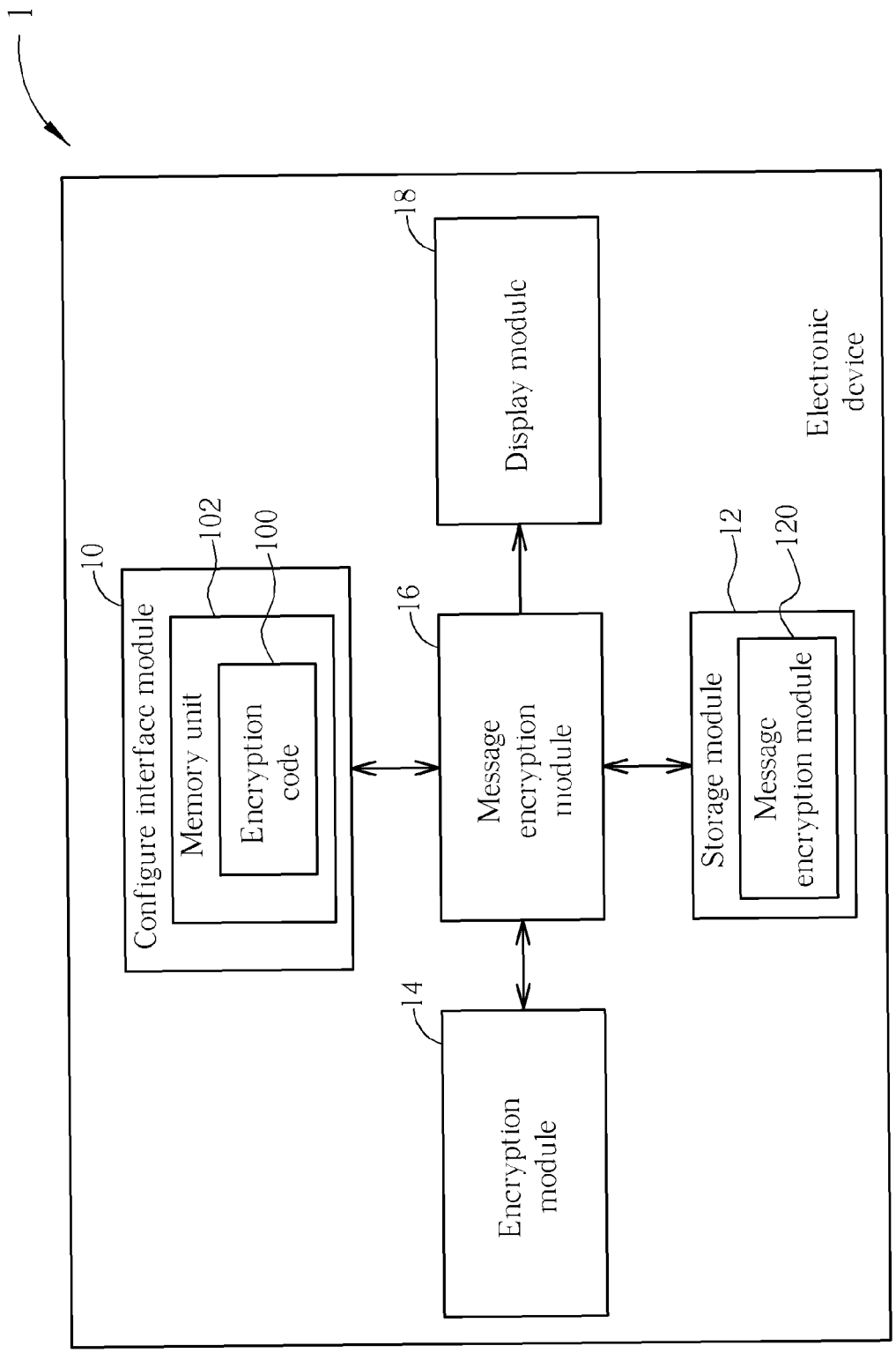
FIG. 1 is a functional block diagram of an electronic device with a message encryption function according to an embodiment of the present invention.

Please refer to FIG. 1, which is a functional block diagram of an electronic device 1 with a message encryption function according to an embodiment of the present invention. As shown in FIG. 1, the electronic device 1 includes a configure interface module 10, a storage module 12, an encryption module 14, a message processing module 16, and a display module 18. The electronic device 1 can be a mobile phone, a PDA, a tablet computer, or other electronic device capable of receiving or sending messages via SMS, MMS, an e-mail service, or other message service. In practical application, the storage module 12 can be a non-volatile memory (e.g. a flash memory) or other data storage device. The display module 18 can be an LCD (Liquid Crystal Display) device or other display device. The message processing module 16 can be a processor or a controller with a data processing function. Furthermore, the configure interface module 10 and the encryption module 14 can be implemented by a software/hardware circuit design. The configure interface module 10 allows a user to set an encryption code 100. In this embodiment, the configure interface module 10 further includes a memory unit 102 for storing the encryption code 100 set by the user. In practical application, the memory unit 102 can be a non-volatile memory (e.g. a flash memory) or other data storage device.

Figure 2A:
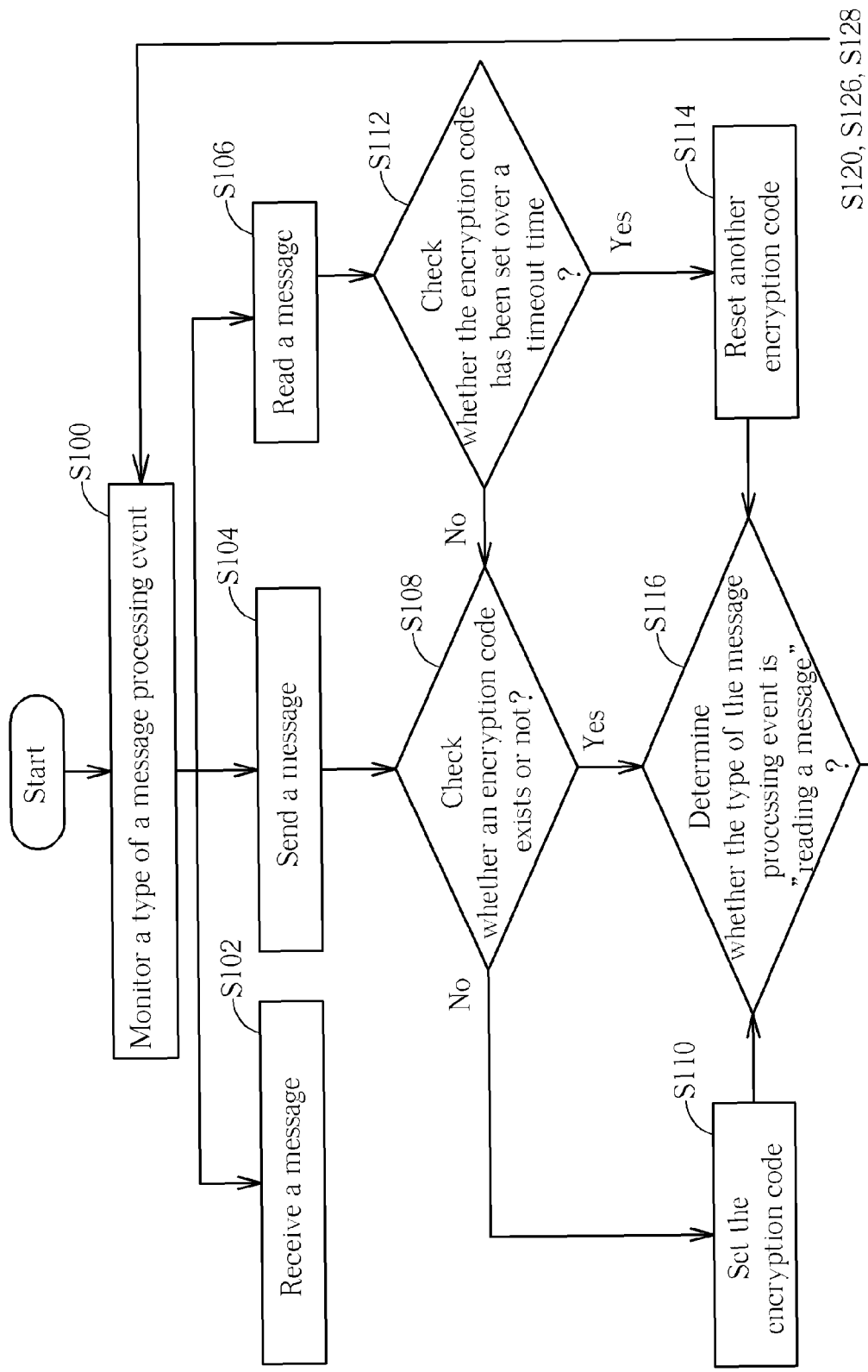
FIG. 2A and FIG. 2B are a flowchart of a message encryption method according to an embodiment of the present invention.
Figure 2B:
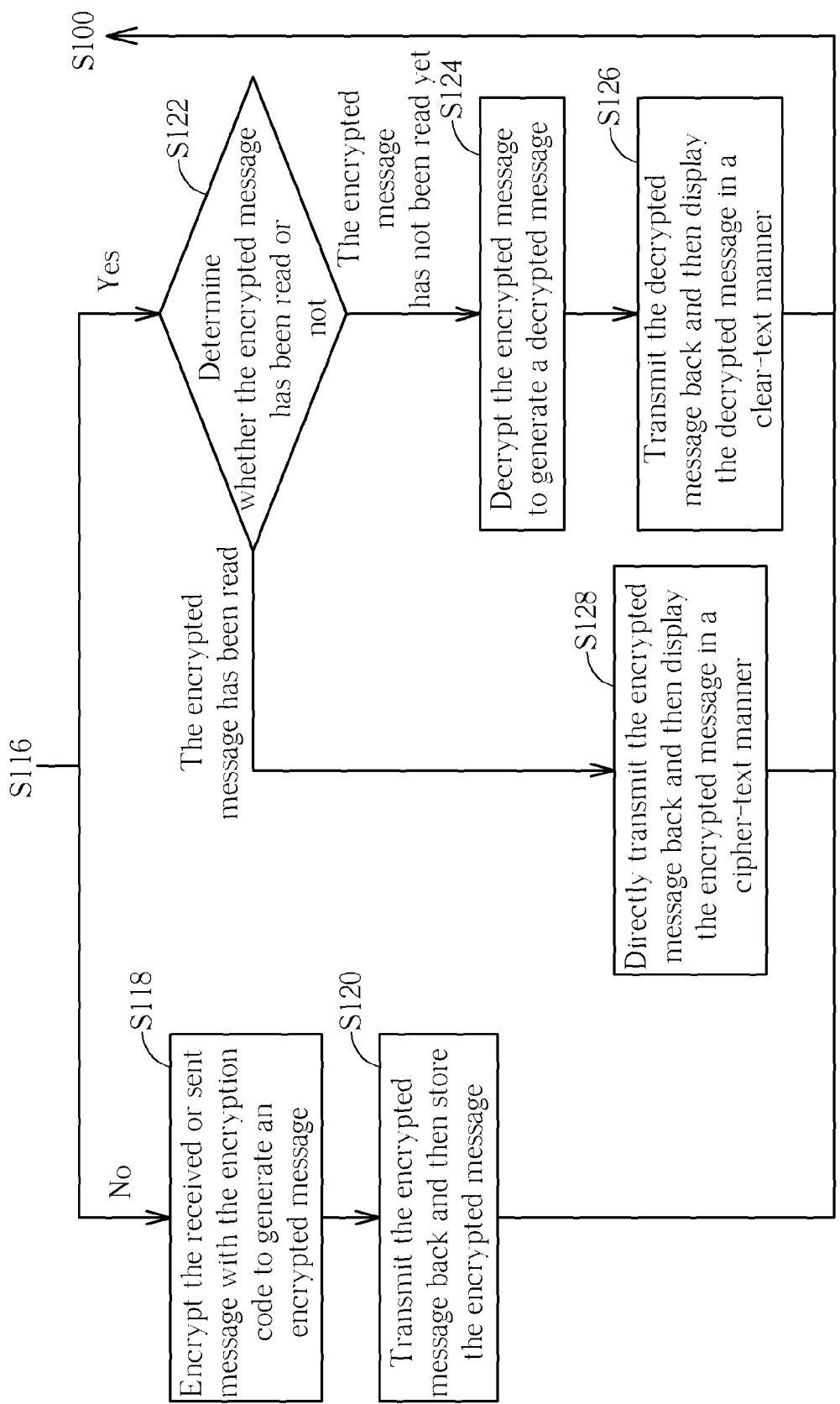

Please refer to FIG. 2A and FIG. 2B, which are a flowchart of a message encryption method according to an embodiment of the present invention. The message encryption method in FIG. 2A and FIG. 2B can be implemented by a message encryption software 120 via software programming. The message encryption software 120 can be installed in the storage module 12 of the electronic device 1 (as shown in FIG. 1). In the following, more detailed description for how to utilize the electronic device 1 to perform the message encryption method in FIG. 2A and FIG. 2B is provided.

At first, in Step S100, the message processing module 16 monitors a type of a message processing event. In this embodiment, three types of message processing events are registered in the message encryption software 120, such as "receiving a message", "sending a message", and "reading a message". When one of the said message processing events occurs, the message encryption software 120 transmits a corresponding signal to trigger the message processing module 16 to perform a corresponding action. As shown in FIG. 2, the message processing module 16 receives a message in Step S102, sends a message in Step S104, or reads a message in Step S106.

When the message processing module 16 receives or sends a message (Step S102 or Step S104), the message processing module 16 checks whether the encryption code 100 exists (Step S108). If the encryption code 100 does not exist, the message processing module 16 triggers the configure interface module 10 to give the user a notice of setting the encryption code 100 (Step S110). Furthermore, when the message processing module 16 reads the message from the storage module 12 (Step S106), the message processing module 16 checks whether the encryption code 100 has been set over a timeout time (e.g. twelve hours or one day) in Step S112. If the encryption code 100 has been set over the timeout time (e.g. the timeout time is set as one day and the encryption code 100 has been set for three days), the message processing module 16 triggers the configure interface module 10 to give the user a notice of resetting another encryption code (Step S114). If the encryption code 100 has been not set over the timeout time (e.g. the timeout time is set as one day and the encryption code 100 just has been set for three hours), the message processing module 16 checks whether the encryption code 100 exists again (Step S108). If the encryption code 100 does not exist, the message processing module 16 triggers the configure interface module 10 to give the user a notice of setting the encryption code 100 (Step S110). In this embodiment, the user can also utilize the configure interface module 10 to set the said timeout time.

If it is determined that the encryption code 100 exists in Step S108, go to Step S116, meaning that the message processing module 16 determines whether the type of the message processing event is "reading a message". If not, go to Step S118; if so, go to Step S122. Furthermore, after performing Step S110 or Step S114, Step S116 is then performed. In this embodiment, the message processing module 16 determines whether to read the message according to a flag transmitted from the message encryption software 120.

If the message processing module 16 determines that the type of the message processing event is not "reading a message" but "receiving a message" or "sending a message", the message processing module 16 accesses the encryption code 100 from the memory unit 102 of the configure interface module 10 and then transmits the received or sent message and the encryption code 100 to the encryption module 14, so that the encryption module 14 can encrypt the received or sent message with the encryption code 100 to generate an encrypted message (Step S118). Subsequently, the encryption module 14 transmits the encrypted message to the message processing module 16, and then the message processing module 16 stores the encrypted message in the storage module 12 (Step S120). Afterwards, go back to Step S100, meaning that the message processing module 16 keeps monitoring a type of any message processing event.

If the message processing module 16 determines that the type of the message processing event is "reading a message", the message processing module 16 accesses the encryption code 100 from the memory unit 102 of the configure interface module 10 and then transmits the encrypted message stored in the storage module 12, a message type, and the encryption code 100 to the encryption module 14. At this time, the encryption module 14 determines whether the encrypted message has been read or not according to the message type (Step S122). If the encrypted message has been not read yet, the encryption module 14 decrypts the encrypted message with the encryption code 100 to generate a decrypted message (Step S124) and then transmits the decrypted message to the message processing module 16, so that the message processing module 16 can display the decrypted message on the display module 18 in a clear-text manner (Step S126). If the encrypted message has been read, the encryption module 14 directly transmits the encrypted message to the message processing module 16, meaning that the encryption module 14 does not decrypt the encrypted message. Accordingly, the message processing module 16 displays the encrypted message on the display module 18 in a cipher-text manner (Step S128). After the user finishes reading the message, go back to Step S100, meaning that the message processing module 16 keeps monitoring a type of any message processing event.

In such a manner, private messages of the owner of the electronic device can be stored in the electronic device in a cipher-text manner (i.e. unrecognizable codes), so as to prevent the private messages from being viewed by other person accidentally or purposely. Furthermore, if the user stores the said encrypted message in an SIM (Subscriber Identity Module) card and then installs the SIM card in an electronic device without the message encryption software 120 of the present invention, the encrypted message can not be displayed correctly in this electronic device so that the encrypted message can be kept secret.

Compared with the prior art, the present invention allows a user to utilize the configure interface module in the electronic device to set the encryption code. When the user utilizes the electronic device to receive or send a message, the encryption module encrypts the received or sent message with the encryption code to generate an encrypted message. The encrypted message is stored in the storage module in a cipher-text manner so as to prevent the encrypted message from being viewed by other person accidentally or purposely. When the owner of the electronic device wants to read the encrypted message stored in the storage module and the encrypted message has been not read yet, the encryption module decrypts the encrypted message with the encryption code to generate a decrypted message. The decrypted message can be displayed in a clear-text manner. On the other hand, if the encrypted message has been read, the encryption module does not decrypt the encrypted message, meaning that the encrypted message is displayed in a cipher-text manner instead, so as to keep the encrypted message secret. If the owner wants to read this encrypted message, the owner just needs to input the encryption code so that the encrypted message can be displayed in a clear-text manner.

Furthermore, the prevent invention further allows the user to utilize the configure interface module in the electronic device to set a timeout time of the encryption code (e.g. twelve hours or one day). When a user (not the owner) of the electronic device wants to read the encrypted message which has been not read yet, the message processing module of the electronic device will check whether the encryption code has been set over the timeout time. If the encryption code has been set over the timeout time (e.g. the timeout time is set as one day and the encryption code has been set for three days), the configure interface module of the electronic device will be triggered to give the user a notice of resetting another encryption code. At this time, even if the encrypted message has been not read yet, the electronic device does not decrypt the encrypted message so as to keep the encrypted message secret. In other words, even if the electronic device is lent or lost, the owner does not have to worry that encrypted messages in the electronic device are viewed by other person accidentally or purposely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with a message encryption function, the electronic device comprising:
    a configure interface module for a user to set an encryption code;
    a storage module;
    an encryption module; and
    a message processing module;
        wherein the message processing module is electrically connected to the configure interface module, the storage module and the encryption module for receiving, sending, or reading a message;
        the message processing module checking whether the encryption code exists;
        the message processing module determining whether the type of the message processing event is "reading a message";
        if the processing module determines the processing event is not "reading a message" encrypt the received or sent message with the encryption code to generate an encrypted message and transmit the encrypted message back and then store the encrypted message;
        if the processing module determines the processing event is "reading a message" the processing module determines whether the encrypted message has been read yet ever, or not;
            if the encrypted message has been read, directly transmit the encrypted message back and then display the encrypted message in a cipher-text manner;
            if the encrypted message has not been read, decrypt the encrypted message to generate a decrypted message, transmit the decrypted message back and then display the decrypted message in a clear-text manner.

2. The electronic device of claim 1, wherein the message processing module checks whether the encryption code exists when the message processing module receives or sends the message, and the message processing module triggers the configure interface module to set the encryption code if the encryption does not exist.

3. The electronic device of claim 1, wherein the message processing module accesses the encryption code from the configure interface module and transmits the encrypted message, a message type, and the encryption code to the encryption module when the message processing module reads the encrypted message from the storage module, the encryption module determines whether the encrypted message has been read or not, the encryption module decrypts the encrypted message with the encryption code to generate a decrypted message and then transmits the decrypted message to the message processing module if the encrypted message has been not read yet, and the encryption module directly transmits the encrypted message to the message processing module if the encrypted message has been read.

4. The electronic device of claim 3 further comprising:
    a display module electrically connected to the message processing module for displaying the encrypted message or the decrypted message.

5. The electronic device of claim 3, wherein the message processing module checks whether the encryption code has been set over a timeout time when the message processing module reads the encrypted message from the storage module, and the message processing module triggers the configure interface module to reset another encryption code if the encryption code has been set over the timeout time.

6. The electronic device of claim 5, wherein the message processing module checks whether the encrypted code exists if the encrypted code has been not set over the timeout time yet, and the message processing module triggers the configure module to set the encryption code if the encryption code does not exist.

7. The electronic device of claim 1, wherein the configure interface module comprises a memory unit for storing the encryption code.

* * * * *